United States Patent [19]

Iniotakis et al.

[11] Patent Number: 4,643,832
[45] Date of Patent: Feb. 17, 1987

[54] PROCESS FOR WASTE WATER PURIFICATION

[75] Inventors: Nicolaos Iniotakis, Jülich; Werner Fröhling, Düren; Georg Kalawrytinos, Am Steinbruch 2, D-5190 Stolberg; Claus-Benedict von der Decken, Aachen, all of Fed. Rep. of Germany

[73] Assignees: Kernforschungsanlage Jülich GmbH, Jülich; Georg Kalawrytinos, Stolberg, both of Fed. Rep. of Germany

[21] Appl. No.: 660,942

[22] Filed: Oct. 15, 1984

[30] Foreign Application Priority Data

Oct. 14, 1983 [DE] Fed. Rep. of Germany ....... 3337360

[51] Int. Cl.⁴ ............................ B01D 1/14; C02F 1/06
[52] U.S. Cl. .................................... 210/712; 210/737; 210/774; 55/23; 55/57
[58] Field of Search ............... 210/774, 712, 718, 737; 55/23, 52, 55, 57

[56] References Cited

U.S. PATENT DOCUMENTS 3,305,091  2/1967  Brady et al. .................... 210/774
3,306,236  2/1967  Campbell ...................... 210/774 X
4,097,378  6/1978  St. Clair ........................ 210/774 X

FOREIGN PATENT DOCUMENTS 377747  6/1923  Fed. Rep. of Germany.

OTHER PUBLICATIONS

Rautenbach, Robert and Albrecht, Rainer, *Stofftrennung durch Membranen*, Chem.-Ing. Tech. 54 (1982) vol. 3, pp. 229–240.

*Primary Examiner*—Tom Wyse
*Attorney, Agent, or Firm*—Nils H. Ljungman

[57] ABSTRACT

The invention provides a process and an apparatus for effecting that process in which waste water to be cleaned is finely divided into a current of entrainment gas and evaporated. The water vapor formed is superheated, so that the impurities occur as a solid residue and can be collected. The heat of the purified and compressed mixture of entrainment gas and water vapor is used to superheat the water vapor in the current of entrainment gas.

An optimal separation between water and the substances contaminating it which cannot be evaporated is accomplished with a low expenditure of energy by introducing the water into a current of inert entrainment gas and by heating the mixture of entrainment gas and water vapor thereby formed, before the separation of the solid particles, in the heat exchange with the purified and compressed mixture of entrainment gas and water vapor by cooling it to below the saturation or dew point temperature.

19 Claims, 2 Drawing Figures

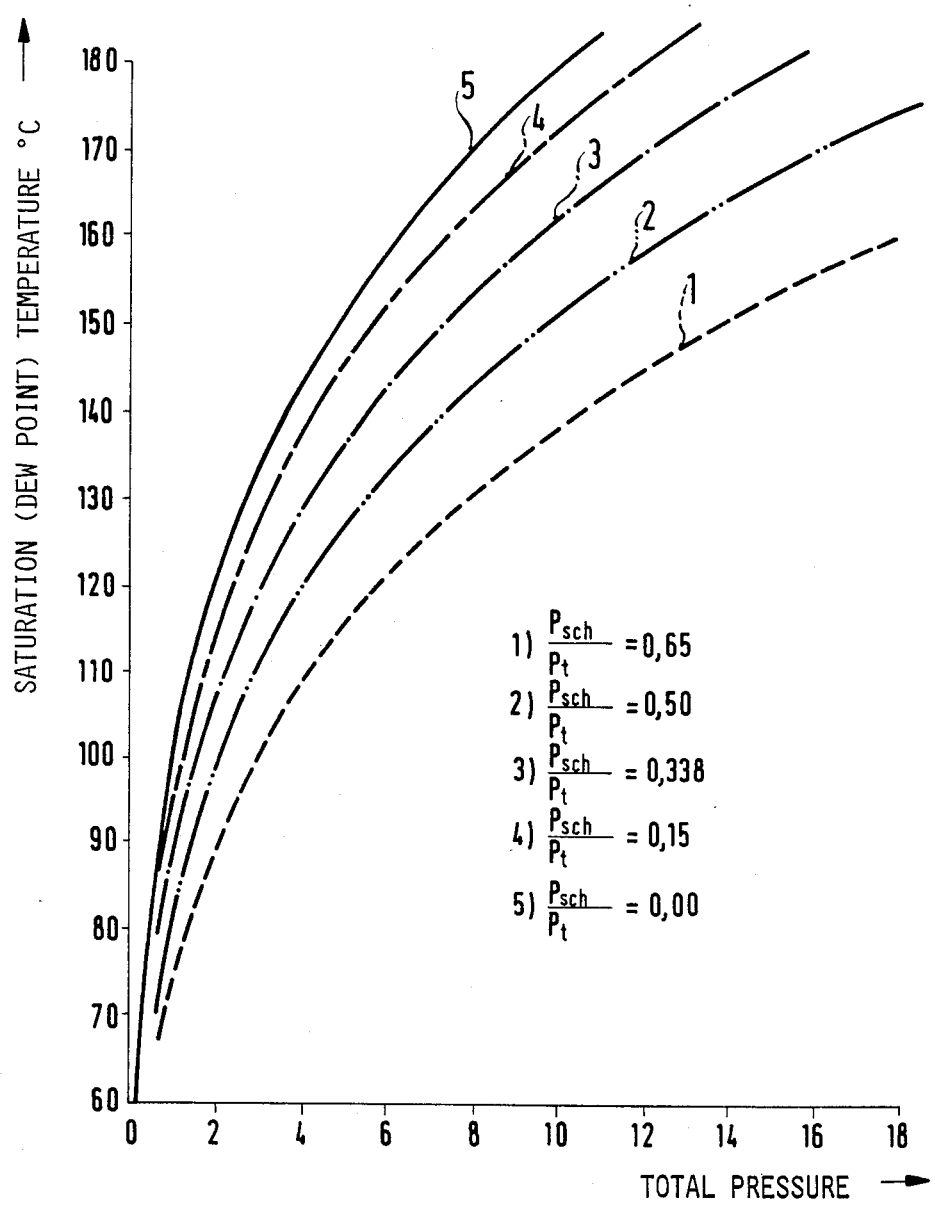

PROCESS FOR WASTE WATER PURIFICATION

BACKGROUND OF THE INVENTION

1. Field of the Invention

The invention relates to a process and apparatus for waste water purification by evaporation of the water to be purified in an entrainment gas current and removal of the residue which is thereby formed.

2. Description of the Prior Art

The primary problems in the purification of waste water are caused by dissolved impurities and pollutants which, although not dissolved in the waste water, are not sedimentary on account of their fineness. Of special importance are industrial waste waters, for which additional purification stages such as chemical precipitations, neutralization of impurities or detoxification by the addition of oxidation agents and the use of ion exchangers, are necessary even before general purification in clarification installations. In most cases, metallic compounds or salts also occur during the purification of such industrial waste waters, the recovery or recycling of which metallic compound or salts is of economic advantage. A qualitatively thorough cleaning of the water up to the purity of distilled water is the objective such processes which include the treatment of brackish water and desalination of sea water. The latter is of special interest in countries which do not have abundant groundwater or rainwater.

A thorough purification of water can be achieved by distillation. The water is heated in an evaporator up to saturation temperature, the steam formed is extracted and condensed in a cooled condenser. When there is complete evaporation, those substances which cannot be evaporated remain in the evaporator as a solid residue. With such an open distillation process, the water is generally not completely distilled, but a liquid fraction very high in salts is extracted from the sump of the distillation column. In this manner, the open distillation process can be carried out continuously, however, the high-salt residue is generally not reusable in the form in which it is extracted from the distillation apparatus and the residue requires further treatment.

Pervaporation is also a known separation process (See, for example, Chemie-Ingenieur-Technik, 1982, No. 3, pp. 229-224, especially p. 232). In this process, fluid to be purified is conducted along the primary side of a membrane to the secondary side of which the components permeating the membrane are transferred in the vapor stage and transported away by a carrier gas. In this process, a high degree of selectivity is achieved in the separation of dissolved components. The substances which do not permeate the membrane remain in the residue fraction on the primary side of the membrane and cannot be separated from it without additional measures.

OBJECTS OF THE INVENTION

An object of the present invention is to provide a process and apparatus for the purification of water by evaporating the water, in which the non-evaporating substances contained in the water can be recovered without the formation of sludge or a liquid residue fraction with a high salt content directly as a non-volatile phase, whereby the degree of purity achieved in the vapor to be extracted can be up to the degree of purity of distilled water. In addition, the process is easy to execute with a small additional expense for chemicals, even with different metal or salt concentrations in the waste water.

SUMMARY OF THE INVENTION

According to the invention, a finely-divided waste water is introduced into an entrainment gas current and the mixture of entrainment gas and water is heated to a temperature which is above the saturation temperature of the water vapor formed during the heating. The saturation temperature is a function of the pressure in the mixture of entrainment gas and water vapor, which is called the total pressure $P_t$ below and of the partial pressure ratio of the partial pressure of the entrainment gas $P_{sch}$ to the total pressure $P_t$, i.e., $P_{sch}/P_t$. The lower the total pressure and the higher the partial pressure ratio $P_{sch}/P_t$, i.e., the less water per unit of volume contained in the entrainment gas current the lower the saturation temperature. If the entrainment gas mixture, however, is only heated to the saturation temperature, then a separation between the water and the non-evaporating substances contaminating the water cannot be optimally achieved. The invention, therefore, makes it possible to achieve a condition where the mixture of entrainment gas and water vapor formed during the evaporation is free of droplets of water, i.e., a superheating of the mixture of entrainment gas and water vapor beyond the saturation temperature. In such a status, the non-evaporating substances are present as electrically neutral solid particles. The finer the division of the water in the entrainment gas stream, the more homogeneous the mixture of entrainment gas and water, which is present in the form of a mist. The fine division of the water in the entrainment gas encourages the transfer of heat and accelerates the evaporation. The solid particles can be filtered out of the superheated mixture of entrainment gas and water vapor as a dry substance and recovered from the separator.

In another configuration of the invention, the process provides for the compression of the purified mixture of entrainment gas and water vapor and then it is used to heat the mixture of entrainment gas and water to be purified, which contains impurities. The compressed mixture of entrainment gas and water vapor is thereby cooled to below the specified saturation or dew point temperature of the water vapor for this pressure, so that the evaporation enthalpy which was previously required for the evaporation of the water to be purified in the mixture of entrainment gas and water is recovered at a higher pressure level. The total energy input required for the purification process of the water is thereby significantly reduced. If, for the execution of the process, heat from outside sources is available, e.g., cheap waste heat from physical or chemical processes, or heat from economically-feasible solar energy, it can be used to make up the heat losses in a purification process, and also for the compression of the purified mixture of entrainment gas and water vapor, and to additionally heat the mixture of entrainment gas and water vapor to be purified to the desired temperature. Another optimization of the thermal balance of the overall process results from the fact that condensate, which is formed during the cooling of the purified mixture of entrainment gas and water vapor, is used to pre-heat the waste water to be purified. The entrainment gas can also be recycled. The pressure in the entrainment gas is thereby adjusted to the pressure at the entrainment gas entrance.

If substances contained in the mixture of entrainment gas and water vapor are recovered as pure salts, then the temperature of the mixture of entrainment gas and water vapor is set before the filtration so that it is higher than the specified decomposition temperature of the undesirable hydrates contained in the mixture of entrainment gas and water vapor. By selecting the superheating temperature in the mixture of entrainment gas and water vapor before filtration, it is therefore possible to determine the condition of the solid particles to be recovered, i.e., to determine whether pure salts or hydrates will be formed.

To achieve a mixture of entrainment gas and water vapor free of water droplets, a superheating of the mixture of entrainment gas and water vapor by at least about 10° to 20° C. above the saturation temperature is necessary. This need not be accomplished solely by the addition of heat, e.g., by a superheater connected in series behind the evaporator. Rather, it may be appropriate, as an alternative or as a supplementary measure, to reduce the mixture of entrainment gas and water vapor to a pressure at which the mixture of entrainment gas and water vapor flows through the separator free of water droplets. In this case, too, the solid particles to be separated can also be recovered dry or as hydrate. To facilitate the separation, the solid particles are coagulated before the entry of the mixture of entrainment gas and water vapor into the separator.

Favorable working conditions for the overall process can be achieved in the mixture of entrainment gas and water vapor to be purified at partial pressure ratios of entrainment gas partial pressure $P_{sch}$ to the total pressure $P_t=0.1$ to 0.8. Taking into account the recovery of heat by condensation, depending on the availability of heat from outside sources, it may be appropriate to set the pressure in the compressed mixture of entrainment gas and water vapor in the range between 1.5 and 20 bar.

BRIEF DESCRIPTION OF THE DRAWINGS

The above as well as other features and advantages of the present invention will become apparent through consideration of the detailed description in conjunction with the accompanying drawings in which:

FIG. 2 is a graph illustrating the saturation or dew point temperature of water in a mixture of entrainment gas and water vapor as a function of the total pressure $P_t$ and the partial pressure ratio $P_{sch}/P_t$.

DETAILED DESCRIPTION OF THE PREFERRED EMBODIMENTS

Figure 1:
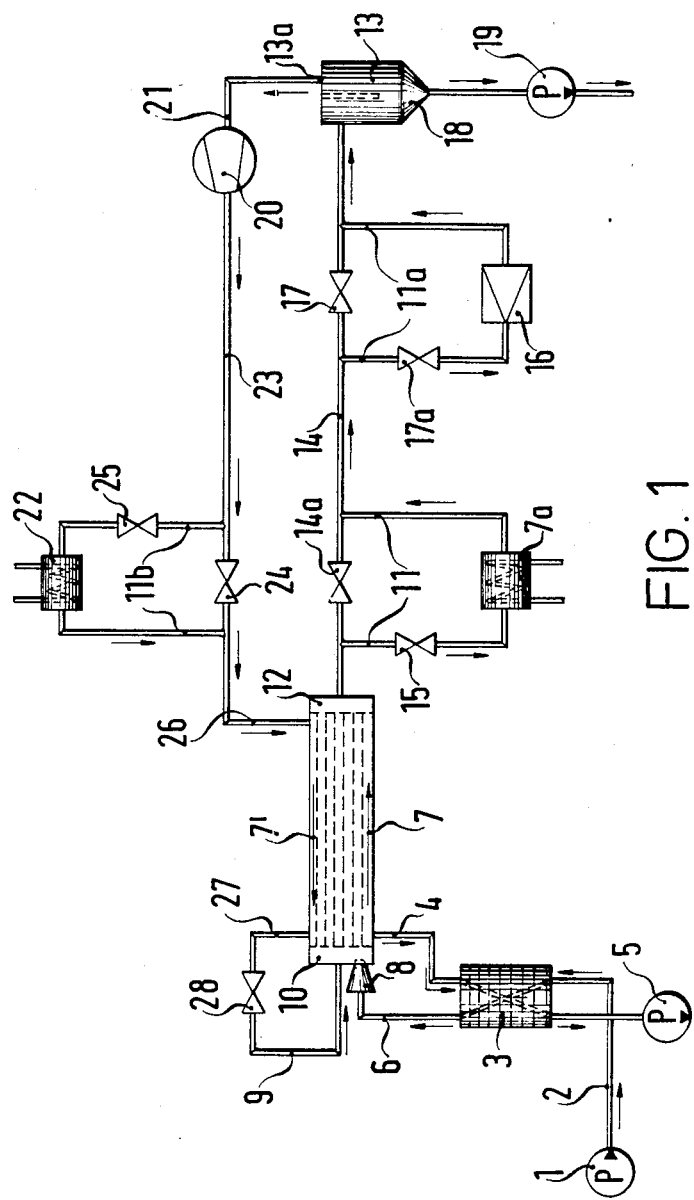
FIG. 1 is a schematical representation of an installation for the purification of waste water, all according to the teachings of this invention.

FIG. 1 shows an installation in which the water to be purified is conducted by means of a fluid pump 1 through a pressure line 2 to the preheater 3. The preheater 3 is designed as a counter-current heat exchanger. In the example, the heating medium for the preheater 3 is condensate flowing in a condensate line 4. The condensate is conveyed by a condensate pump 5 through the preheater 3.

The water to be purified, after its initial heating in the preheater 3, is conducted through a water line 6 to the evaporator 7 and is finely divided there by means of an apparatus 8 in an entrainment gas current; in the example, it is sprayed directly by a nozzle into the entrainment gas current. The current of entrainment gas flows through an entrainment gas line 9 to the evaporator 7. The location of the nozzle at the inlet 10 of the evaporator 7 is shown only schematically in the illustration. Care must be taken that, with the current of entrainment gas, only finely-divided water is entered in the evaporator 7. In place of a spray nozzle, of course, other fluid dividers can be used. A very homogeneous division is achieved with the formation of a mist.

In the evaporator 7, the mixture of entrainment gas and water flowing in through the entrance 10 is heated to a temperature which is higher than the saturation temperature of the water vapor in the mixture of entrainment gas and water vapor. The saturation temperature is a function of the total pressure $P_t$ in the mixture of entrainment gas and water vapor, and of the partial pressure ratio between the partial pressure of the entrainment gas $P_{sch}$ and the total pressure $P_t$. FIG. 2 illustrates the dependence of the saturation or dew point temperature on the total pressure $P_t$ and the partial pressure ratio $P_{sch}/P_t$. The higher the total pressure $P_t$ and the lower the partial pressure ratio $P_{sch}/P_t$, the more water will therefore be sprayed into the entrainment gas at the same total pressure $P_t$, the higher the saturation temperature.

For the achievement of a condition free of water droplets, the mixture of entrainment gas and water vapor must be heated to at least about 10° to 20° C. higher than the saturation temperature. If the heat available in the evaporator 7 is insufficient for the superheating, then the mixture of entrainment gas and water vapor can also be heated to the desired temperature in a superheater 7a in series behind the evaporator 7.

The superheater 7a is accessible by means of a bypass, which runs parallel to the feed line 14 leading from the outlet 12 of the evaporator 7 to the separator 13. The bypass 11 and thus the superheater 7a carry the flow of the mixture of entrainment gas and water vapor after the opening or closing of the cutoff cocks 15 (in the bypass 11) and 14a (in the feed line 14).

The superheated mixture of entrainment gas and water vapor is conducted via the feed line 14 to the separator 13. The separator 13 is capable of retaining those substances which remain unevaporated during the evaporation of the water portion in the current of entrainment gas and which are present as solid particles in the mixture of entrainment gas and water vapor free of water droplets. The separator is therefore to be selected on the basis of the specified degree of purity and it exhibits a filtration quality which satisfies the applicable requirements. Such separators are known in themselves. They are described, for example, in F. A. Henglein, "Grundriss der Chemischen Technik" ("Outline of Chemical Technology"), Verlag Chemie GmbH, Weinheim, 1963, pp. 74 ff., especially p. 125, the contents of which are incorporated herein by reference with regard to the impurities which remain as solid particles in the mixture of entrainment gas and water vapor after the evaporation, a very high purity of the mixture of entrainment gas and water vapor can be achieved which corresponds to the filter quality used.

The installation illustrated schematically in the figure has, parallel to the feed line 14, another bypass 11a, which leads to a pressure reducer 16. The pressure reducer 16 can be activated by opening and closing cutoff valves 17, 17a in the bypass 11a and feed line 14. This is for cases where the superheating of the mixture of entrainment gas and water vapor in the evaporator is not sufficient to achieve a mixture of entrainment gas and water vapor free of water droplets and if a cheap source of heat is not available to provide supplementary heat to the superheater 7a, making possible an economical implementation of the process. In the flowchart shown in FIG. 1, the pressure reducer 16 is represented only schematically as a throttle mechanism.

In the illustrated example, the separator 13 is a chamber in which the entrainment gas current is reversed. The solid particles which are thereby separated from the mixture of entrainment gas and water vapor accumulate on the floor 18 of the separator 13 and are continuously removed by means of a suction device 19.

The purified mixture of entrainment gas and water vapor flowing out of the separator 13 via the separator outlet 13a, for recovery of the heat carried along with the mixture of entrainment gas and water vapor as a heating medium, flows in heating lines 7' back into the evaporator 7. The mixture of entrainment gas and water vapor is extracted from the separator 13 for this purpose by means of a compressor 20, via its suction line 21, and compressed so that the water portion is condensed during cooling and gives up its heat to the mixture of entrainment gas and water to be purified, at a dew point temperature which is above the saturation temperature of the water vapor in the mixture of entrainment gas and water vapor to be purified. The heat recovered during the condensation of the purified water portion is thereby transferred to the mixture of entrainment gas and water or water vapor to be purified.

If the temperature difference between the dew point temperature on the one hand and the saturation temperature in the evaporator on the other hand by compression alone is not sufficient to make the mixture of entrainment gas and water vapor to be purified free of water droplets, then the compressed mixture of entrainment gas and water vapor can be heated in a supplementary heater 22. The heater 22 in the example is connected in a bypass 11b to the pressure line 23 of the compressor 20. The mixture of entrainment gas and water vapor, or a portion of it, can be conducted into the heater 22 by controlling the cutoff valves 24, 25 in the pressure line 23 and bypass 11b. The heat source for the superheater 7a for the mixture of entrainment gas and water vapor to be purified can, for example, be waste heat or heat obtained by the conversion of solar energy. The more the purified mixture of entrainment gas and water vapor is compressed, the less additional heating of the mixture of entrainment gas and water vapor is necessary in the heater 22, to achieve a condition where the mixture of entrainment gas and water vapor to be purified is free of water droplets.

From the heater 22, a connection line 26 leads to the evaporator 7. In the example, the evaporator 7 is designed as a tubular boiler with tubes as the heating medium lines 7'. The compressed mixture of entrainment gas and water vapor in the evaporator 7 flows in the tubes. The compressed mixture of entrainment gas and water vapor is cooled below the dew point temperature of the water vapor in the mixture of entrainment gas and water vapor. The condensate which is thereby formed travels through the condensate line 4 to the preheater 3, while the remaining compressed entrainment gas is returned via an outlet 27 to the input 10 of the evaporator 7 in the circuit. The pressure in the entrainment gas is hereby set by means of a pressure controller 28 at the pressure in the entrainment gas line 9. At the entrance 10 of the evaporator 7, the entrainment gas current is then again charged with water to be purified.

If waste water containing NiSO4, for example, is purified in the installation described above, then NiSO4 can be recovered either as a dry salt or as a hydrate, NiSO4.6H2O. For the hydrate, the free reaction enthalpy $\Delta H$ and the entropy $\Delta S$ of the reaction are:

$$NiSO_4 + 6H_2O \rightleftharpoons NiSO_4.6H_2O$$

$$\Delta H = -85.80 \text{ Cal/Mol}$$

$$\Delta S = 213.23 \text{ Cal/Mol K}.$$

With these values, the required partial pressure of the water vapor $P_{HO}^*$ for the formation of hydrate from the equation:

$$P_{H_2O}^* = e^{\frac{1}{6} \frac{\Delta S}{R}} \cdot e^{-\frac{1}{6} \frac{\Delta H}{RT}} \text{ bar}$$

is:

$P_{H_2O}^* = 2.42$ bar at $T = 150°$ C.
$P_{H_2O}^* = 5.17$ bar at $T = 170°$ C.

If the mixture of entrainment gas and water vapor to be purified is set at a total pressure $P_t = 8$ bar and finely-divided waste water containing NiSO4 is injected into the entrainment gas up to a partial pressure ratio $P_{sch}/P_t = 0.5$, then there is a partial pressure of $P_{H_2O} = 4$ bar.

Corresponding to this partial pressure, considering the above-mentioned values as the formation temperature for NiSO4.6H2O is a temperature of $T-165°$ C. For temperatures in the mixture of entrainment gas and water vapor above this temperature, i.e., for $T-165°$ C., solid particles which consist of dry salt NiSO4 remain in the mixture of entrainment gas and water vapor.

If waste water containing NiCl2 is to be purified, then either the dry salt NiCl2 or a hydrate NiCl2.2H2O can be receovered. For the hydrate formation, a water vapor partial pressure of:

$$P_{H_2O}^* = 5.1806 \cdot 10^7 \cdot e^{-\frac{6958.5}{T}} \text{ bar}$$

is necessary. From this, it follows that:

$P_{H_2O}^* = 3.716$ bar at $T = 150°$ C.
$P_{H_2O}^* = 6.529$ bar at $T = 165°$ C.

If the total pressure of the mixture of entrainment gas and water vapor is set at 8 bar and if $P_{sch}/P_t = 0.5$, then the formation temperature for the hydrate NiCl2.2H2O is a temperature $T = 153°$ C. For temperatures in the mixture of entrainment gas and water vapor above this temperature, i.e., for T 153° C., according to this equation, dry salt particles NiCl2 can therefore be separated from the mixture of entrainment gas and water vapor.

The preheater 3 can, for example, be adjusted so that the quantity of waste water to be purified can be sprayed at a temperature of approximately 60° C. or even higher into the current of entrainment gas. The current of entrainment gas and the quality of waste water sprayed in are adjusted to one another so that in the mixture of entrainment gas and water vapor, there is a partial pressure ratio of the entrainment gas partial pressure $P_{sch}$ to the total pressure $P_t$ in the range between 0.1 and 0.8. At a partial pressure ratio $P_{sch}/P_t = 0.4$ and a total pressure of $P_t = 5$ bar, the saturation temperature for the water vapor is approximately 130° 'C. To achieve a condition free of water droplets, a superheating of the mixture of entrainment gas and water vapor of at least 10° to 20° C. above the saturation temperature is necessary. If it is assumed that for this superheating in the evaporator 7, there is a temperature difference of 20° C. between the compressed purified mixture of entrainment gas and water vapor used as the heating medium and the mixture of entrainment gas and water vapor to be purified, then the purified mixture of entrainment gas and water vapor at the same partial pressure ratio $P_{sch}/P_t$ is to be compressed without additional superheating in the heater 22 to an approximate total pressure of 14 bar. Taking into account the transfer of heat in the evaporator 7, a total pressure is generally to be set in the range between 1.5 and 20 bar. At a lower compression, for the achievement of a mixture of entrainment gas and water vapor free of water droplets, an additional heating of the compressed mixture of entrainment gas and water vapor in the heater 22 is necessary. Alternatively, or in combination with all the other measures mentioned above, for the secure achievement of a condition free of water droplets, it is also possible to reduce the total pressure in the mixture of entrainment gas and water vapor in the pressure relief apparatus 16 before the separation of the solid particles. In the example, the pressure reducer 16 is designed as a swirl chamber, to coagulate the solid particles, taking advantage of adhesion. The solid particles are separated from the superheated mixture of entrainment gas and water vapor in the separator 13. A purified mixture of entrainment gas and water vapor flows into the separator 13.

Usable entrainment gases include helium, argon, nitrogen, air or other gases which react neither with the water nor with the substances to be removed which are contained in the waste water.

To consume as little energy as possible in the compression and heating of the purified mixture of entrainment gas and water vapor, the working range must be optimized. At partial pressure ratios $P_{sch}/P_t$ between 0.1 and 0.8, at total pressures between 1.5 and 20 bar at the compressor outlet, and at temperatures below 220° C., favorable working conditions can be established for the execution of the process.

What has been described is a unique process and apparatus for the purification of waste water. The invention is not to be taken as limited to all the details that are described hereinabove, since modifications and variations thereof may be made without departing from the spirit or scope of the invention.

What is claimed is:

1. A process for the purification of waste water comprising the steps of:
   introducing finely-divided waste water with solid particles or dissolved substances therein into a current of inert entrainment gas to form a mixture of entrainment gas and waste water;
   superheating said mixture through heat exchange;
   separating the solid particles from the superheated mixture, thereby rendering a purified mixture of entrainment gas and water vapor;
   compressing the purified mixture thus cooling the purified mixture below the saturation or dew point temperature thereof; and
   recovering heat from the cooled purified mixture for use in the superheating of said mixture through heat exchange.

2. The process for the purification of waste water according to claim 1 including the steps of preheating the waste water to be purified prior to the formation of the mixture of entrainment gas and waste water.

3. The process for the purification of waste water according to claim 2 further including the steps of separating the entrainment gas from the purified mixture of entrainment gas and water vapor and recycling the separated entrainment gas for use in the current of entrainment gas into which waste water is introduced.

4. The process for the purification of waste water according to claim 3 including the step of controlling the pressure of the recycled separated entrainment gas during the water purification process.

5. The process for the purification of waste water according to claim 1 wherein the mixture of entrainment gas and water vapor includes at least one hydrate therein and wherein the step of super-heating the mixture elevates the mixture to a temperature which is above the decomposition temperature of at least one of the hydrates.

6. The process for the purification of waste water according to claim 1 wherein the step of separating the solid particles from the mixture of water vapor, solid particles and entrainment gas is effected at a pressure at which the mixture is free of water droplets.

7. The process for the purification of waste water according to claim 1 including the step of coagulating the solid particles prior to the separation thereof from the mixture of water vapor, solid particles and entrainment gas.

8. The process for the purification of waste water according to claim 1 wherein the water to be purified is added to the current of entrainment gas in a predetermined quantity such that a partial pressure ratio is established in the mixture of entrainment gas and water vapor prior to the step of separating such that the entrainment gas partial pressure $P_{sch}$ and the total pressure of the mixture of entrainment gas and water vapor $P_t$ in the range $P_{sch}/P_t=0.1$ to 0.8.

9. The process for the purification of waste water according to claim 1 the purified mixture of entrainment gas and water vapor is compressed at a total pressure in the range between 1.5 and 20 bar.

10. In a process for the purification of waste water which includes the steps of evaporating the water to be purified in a current of entrainment gas and removing the residue formed during the evaporation, the improvement comprising the steps of:
    introducing finely-divided waste water with solid particles therein into the current of entrainment gas to form a mixture of the entrainment gas and the waste water;
    heating said mixture to a temperature which is above the saturation temperature of water vapor which is formed during the heating of said mixture, wherein the water vapor, solid particles and entrainment gas mixture resulting from said heating is substantially freed of water droplets; and
    separating the solid particles from said mixture of water vapor, solid particles and entrainment gas wherein a purified mixture of entrainment gas and water vapor results.

11. The improved process for the purification of waste water according to claim 10 including the steps of separating the water vapor from the purified mixture of entrainment gas and water results; compressing the separated water vapor to cool the separated water vapor below the saturation or dew point temperature of the water vapor in the mixture of entrainment gas and water vapor; and recovering heat generated during the cooling of the separated water vapor to heat the mixture of entrainment gas and water or water vapor to be purified by evaporation.

12. The improved process for the purification of waste water according to claim 10 including the step of preheating the waste water to be purified prior to evaporation thereof.

13. The improved process for the purification of waste water according to claim 11 wherein the entrainment gas separated from the purified mixture of entrainment gas and water vapor is recycled for use in the current of entrainment gas into which waste water is introduced.

14. The improved process for the purification of waste water according to claim 13 including the step of controlling the pressure of the recycled entrainment gas during the water purification process.

15. The improved process for the purification of waste water according to claim 10 wherein the mixture of entrainment gas and water vapor includes at least one hydrate therein and wherein the step of heating the mixture elevates the mixture to a temperature which is above the decomposition temperature of at least one of the hydrates.

16. The improved process for the purification of waste water according to claim 10 wherein the step of separating the solid particles from the mixture of water vapor, solid particles and entrainment gas is effected at a pressure at which the mixture is free of water droplets.

17. The improved process for the purification of waste water according to claim 10 including the step of coagulating the solid particles prior to the separation thereof from the mixture of water vapor, solid particles and entrainment gas.

18. The improved process for the purification of waste water according to claim 10 wherein the water to be purified is added to the current of entrainment gas in a predetermined quantity such that a partial pressure ratio is established in the mixture of entrainment gas and water vapor prior to the step of separating such that the entrainment gas partial pressure $P_{sch}$ and the total pressure of the mixture of entrainment gas and water vapor $P_t$ in the range $P_{sch}/P_t=0.1$ to 0.8.

19. The improved process for the purification of waste water according to claim 11 the purified mixture of entrainment gas and water vapor is compressed at a total pressure in the range between 1.5 and 20 bar.

* * * * *